United States Patent
Sun

(10) Patent No.: US 10,574,052 B2
(45) Date of Patent: Feb. 25, 2020

(54) HIGH VOLTAGE CLAMP WITH POSITIVE AND NEGATIVE PROTECTION

(71) Applicant: SEMICONDUCTOR COMPONENTS INDUSTRIES, LLC, Phoenix, AZ (US)

(72) Inventor: WeiMing Sun, Beijing (CN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 421 days.

(21) Appl. No.: 15/658,658

(22) Filed: Jul. 25, 2017

(65) Prior Publication Data

US 2019/0036331 A1    Jan. 31, 2019

(51) Int. Cl.
| | |
|---|---|
| *H02H 9/04* | (2006.01) |
| *H02H 1/00* | (2006.01) |
| *H02H 11/00* | (2006.01) |
| *H01R 24/60* | (2011.01) |
| *H01R 107/00* | (2006.01) |

(52) U.S. Cl.
CPC .......... *H02H 9/046* (2013.01); *H02H 1/0007* (2013.01); *H02H 9/04* (2013.01); *H02H 9/044* (2013.01); *H02H 11/002* (2013.01); *H01R 24/60* (2013.01); *H01R 2107/00* (2013.01)

(58) Field of Classification Search
CPC .. H01R 2107/00; H01R 24/60; H02H 11/002; H02H 1/0007; H02H 9/04; H02H 9/044; H02H 9/046; G01R 19/14; G01R 19/165; G01R 19/175; G01R 19/30
See application file for complete search history.

(56) References Cited

U.S. PATENT DOCUMENTS

| | | | | |
|---|---|---|---|---|
| 3,493,785 A | * | 2/1970 | Rapp | H03K 3/356104 327/210 |
| 4,262,221 A | * | 4/1981 | Dingwall | G01R 19/0038 327/63 |
| 7,274,543 B2 | | 9/2007 | Nishikawa et al. | |
| 8,729,950 B2 | | 5/2014 | Gagne et al. | |
| 2001/0052795 A1 | * | 12/2001 | Lee | H03K 19/0002 326/83 |
| 2014/0164795 A1 | * | 6/2014 | Wright | H04L 12/10 713/300 |

* cited by examiner

*Primary Examiner* — Thienvu V Tran
*Assistant Examiner* — Nicolas Bellido
(74) *Attorney, Agent, or Firm* — AMPACC Law Group, PLLC

(57) ABSTRACT

A circuit for power supply protection comprising a first n-channel Metal Oxide Semiconductor Field Effect Transistor (nMOSFET) and a first p-channel Metal Oxide Semiconductor Field Effect Transistor (pMOSFET) each having a drain terminal coupled to an input voltage, a second nMOSFET and a second pMOSFET having drain terminals coupled to an output voltage and sources coupled to a sources of the first and second nMOSFET, respectively, and a control circuit. The control circuit turns the nMOSFETs off and the pMOSFETs on when the input voltage has a voltage value greater than zero and less than a predetermined positive limit, operates the nMOSFETs in a saturation mode and turns the pMOSFETs off when the input voltage has a voltage value greater than the predetermined positive limit, and turn the nMOSFETs and pMOSFETs off when the input voltage has a voltage value less than zero.

20 Claims, 2 Drawing Sheets ent power voltage through the two nMOSFETs. When the input voltage is less than the ground, the nMOSFETs and pMOSFETs are turned off and the protected internal power voltage is clamped to ground. The limit voltage may correspond to a breakdown voltage of a Zener diode, for example, 5 volts.

HIGH VOLTAGE CLAMP WITH POSITIVE AND NEGATIVE PROTECTION

FIELD OF THE DISCLOSURE

The present disclosure relates generally to electronic circuits, and more particularly to electronic circuits to protect electronic devices from improper voltages.

BACKGROUND

Electronic devices may be damaged if supplied with voltages that are higher than a design limit or that have an incorrect polarity. The supplying of such improper voltages may occur for a number of reasons.

For example, the Universal Serial Bus (USB) standard has been updated to permit the provisioning of either 5, 12, or 20 volt supply voltages to USB devices. Whether to provides 5, 12, or 20 volts is determined according to a negotiation between the USB device supplying the power and the USB device receiving the power.

The USB standard has also been updated to include connectors that have a finer contact pitch. As a result, shorting or misalignments may occur. This may cause the supply voltage to be delivered to a ground terminal of the USB device and vice-versa, reversing the polarity of the supply voltage from the perspective of the USB device receiving it.

If the voltage negotiation process malfunctions or a defect exists in the connection between the USB device supplying the power and the USB device receiving the power, one or both USB devices may be damaged. For example, a USB device designed to operate from 5 volts may be damaged upon receiving 20 volts, −5 volts, or −20 volts on its power supply input.

Accordingly, it is desirable to have circuits and methods for protecting devices from voltage above a design value and from voltages having improper polarities.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1A:
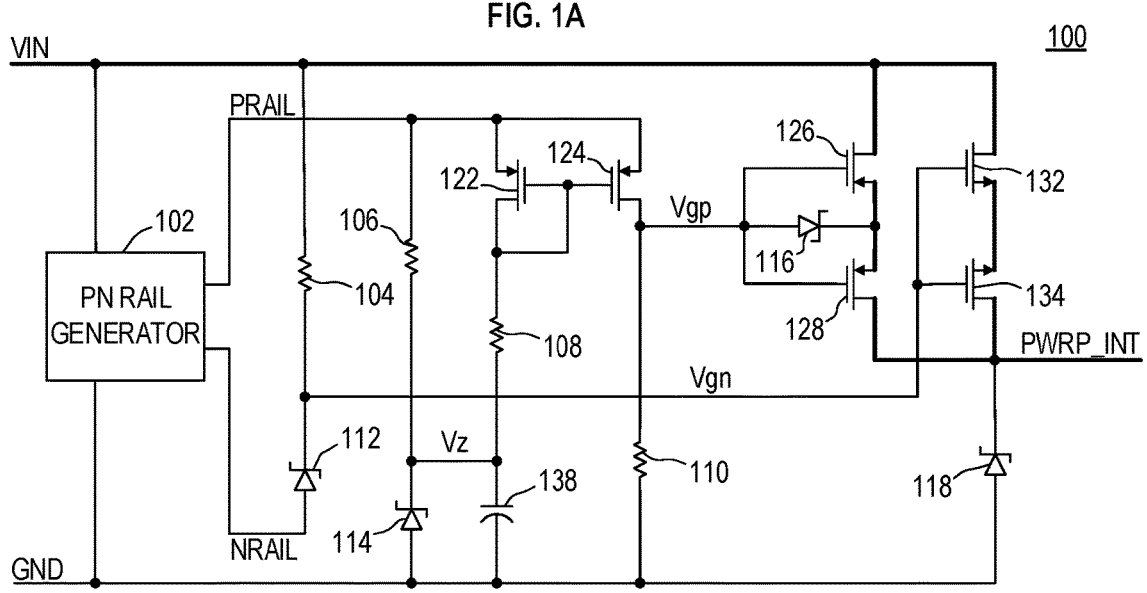
FIG. 1A illustrates a protection circuit for protecting an electronic device from improper input voltages according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

The present disclosure relates generally to electronics, and more particularly to electronic circuits for protecting electronic devices from input or supply voltages that are too high or that have an incorrect polarity.

Embodiments provide, among other advantages, robust protection from both voltages above a design limit and voltages having an opposite polarity to a design requirement.

In one embodiment, Metal Oxide Semiconductor Field Effect Transistors (MOSFETs) having a same channel type are coupled together source-to-source and used to generate a protected internal power voltage from an input voltage. The MOSFETs include two n-channel MOSFETs (nMOSFETs) coupled source-to-source and connected in parallel with two p-channel MOSFETs (pMOSFETs) coupled source-to-source. When the input voltage is greater than a ground by less than a limit voltage, the two pMOSFETs are turned on and the two nMOSFETs are turned off, so that the input voltage is provided to the protected internal power voltage through the two p-channel MOSFETs. When the input voltage is greater than the ground by more than the limit voltage, the two pMOSFETs are turned off and the two nMOSFETs operate in a saturation mode, so that the input voltage is provided to the protected internal power voltage through the two nMOSFETs and clamped to the limit voltage. When the input voltage is less than the ground, the nMOSFETs and pMOSFETs are turned off and the protected internal power voltage is clamped to ground. The limit voltage may correspond to a breakdown voltage of a Zener diode, for example, 5 volts.

In the following detailed description, certain illustrative embodiments have been illustrated and described. As those skilled in the art would realize, these embodiments may be modified in various different ways without departing from the scope of the present disclosure. For example, a circuit designed to provide a protected internal power voltage having a positive magnitude relative to a ground may be modified to provide a protected internal power voltage having a negative magnitude relative to the ground by, for example, changing p-channel devices to n-channel devices, reversing polarities of diodes, and other such changes. Accordingly, the drawings and description are to be regarded as illustrative in nature and not restrictive. Similar reference numerals designate similar elements in the specification.

FIG. 1A illustrates a protection circuit 100 for protecting an electronic device from improper input voltages, according to an embodiment. The circuit receives an input voltage VIN and provides a protected internal power voltage PWRP_INT to the electronic device.

The protection circuit 100 includes a Positive and Negative (PN) rail generator circuit 102, first, second, third, and fourth resistors 104, 106, 108, and 110, first, second, third, and fourth Zener diodes 112, 114, 116, and 118, first, second, third, and fourth p-channel Metal Oxide Semiconductor Field Effect Transistors (pMOSFETs) 122, 124, 126, and 128, first and second n-channel MOSFETS (nMOSFETs) 132 and 134, and a capacitor 138. The PN rail generator circuit 102, the first, second, third, and fourth resistors 104, 106, 108, and 110, the first and second Zener diodes 112 and 114, the first and second pMOSFETs 122 and 124, and the capacitor 138 comprise a control circuit for operating the third and fourth pMOSFETs 126 and 128 and first and second nMOSFETs 132 and 134.

In an illustrative embodiment, the first, second, third, and fourth resistors 104, 106, 108, and 110 each have a resistance of around one megaohm, and the capacitor 138 has a capacitance of around two picofarads.

The input voltage VIN is coupled to the protected internal power voltage PWRP_INT through the first and second nMOSFETs 132 and 134 and through the third and fourth pMOSFETs 126 and 128. Respective drains of the first nMOSFET 132 and the third pMOSFET 126 are coupled to the input voltage VIN. Respective drains of the second nMOSFET 134 and the fourth pMOSFET 128 are coupled to the protected internal power voltage PWRP_INT. A source of the first nMOSFET 132 is coupled to a source of the second nMOSFET 134. A source of the third pMOSFET 126 is coupled to a source of the fourth nMOSFET 128.

Gates of the first and second nMOSFETs 132 and 134 are coupled to each other and to an nMOSFET gate (i.e., control) signal Vgn. Gates of the third and fourth pMOSFETs 126 and 128 are coupled to each other and to a pMOSFET gate (i.e., control) signal Vgp.

Because the first and second nMOSFETs 132 and 134 are series-connected back-to-back (e.g., source-to-source), one of the body diodes of the first and second nMOSFETs 132 and 134 is always reverse biased when the first and second nMOSFETs 132 and 134 are turned off, regardless of the polarity of the input voltage VIN. Similarly, because the third and fourth pMOSFETs 126 and 128 are series-connected back-to-back, one of the body diodes of the third and fourth pMOSFETs 126 and 128 is always reverse biased when the third and fourth pMOSFETs 126 and 128 are turned off, regardless of the polarity of the input voltage VIN. As a result, the back-to-back series connection of the first and second nMOSFETs 132 and 134 and the back-to-back series connection of the third and fourth pMOSFETs 126 and 128 each operate to block a leakage current from flowing through body diodes of the MOSFETs when the input voltage VIN has a negative voltage value with respect to the ground GND.

In an embodiment, the third Zener diode 116 has an anode coupled to the gates of the third and fourth pMOSFETs 126 and 128 and a cathode coupled to the sources of the third and fourth pMOSFETs 126 and 128, and limits respective gate to source voltages of the third and fourth pMOSFETs 126 and 128 to protect the third and fourth pMOSFETs 126 and 128, for example, during a fast power up. In an embodiment, a breakdown voltage of the third Zener diode 116 is less than six (6) volts.

The fourth Zener diode 118 has an anode coupled to a ground GND and a cathode coupled to the protected internal power voltage PWRP_INT. The fourth Zener diode 118 operates to clamp the protected internal power voltage PWRP_INT to a limit voltage (i.e. the breakdown (or Zener) voltage of the fourth Zener diode 118) when the input voltage VIN, relative to the ground GND, has a positive voltage value greater than the limit voltage, and to clamp the protected internal power voltage PWRP_INT to the ground GND when the input voltage VIN has a negative voltage value relative to the ground GND. In an embodiment, a breakdown voltage of the fourth Zener diode 118 is less than six (6) volts.

The PN rail generator circuit 102 generates a positive rail signal PRAIL and a negative rail signal NRAIL using the ground GND and the input voltage VIN. The positive rail signal PRAIL has a voltage value corresponding to whichever of the ground GND and the input voltage VIN has the greatest (i.e., most positive) voltage value relative to the ground GND; that is, when the input voltage VIN is positive with respect to the ground GND, the positive rail signal PRAIL has a voltage value corresponding to the input voltage VIN, and when the input voltage VIN is negative with respect to the ground GND, the positive rail signal PRAIL has a voltage value corresponding to the ground GND. The negative rail signal NRAIL has a voltage value corresponding to whichever of the ground GND and the input voltage VIN has the smallest (i.e. most negative) voltage value relative to the ground GND; that is, when the input voltage VIN is negative with respect to the ground GND, the negative rail signal NRAIL has a voltage value corresponding to the input voltage VIN, and when the input voltage VIN is positive with respect to the ground GND, the negative rail signal NRAIL has a voltage value corresponding to the ground GND.

For example, when the ground GND is considered to be 0V and all voltages are measured relative to the ground GND, in an embodiment:
when the input voltage VIN has a voltage value +5V, the positive rail signal PRAIL has a voltage value of +5V and the negative rail signal NRAIL has a value of 0V,
when the input voltage VIN has a voltage value of +20V, the positive rail signal PRAIL has a value of +20V and the negative rail signal NRAIL has a value of 0V,
when the input voltage VIN has a voltage value of −5V, the positive rail signal PRAIL has a value of 0V and the negative rail signal NRAIL has a value of −5V, and
when the input voltage VIN has a voltage value of −20V, the positive rail signal PRAIL has a value of 0V and the negative rail signal NRAIL has a value of −20V.

The nMOSFET gate signal Vgn is generated using the first resistor 104 and the first Zener diode 112. The first resistor 104 has a first terminal coupled to the input voltage VIN and a second terminal coupled to the nMOSFET gate signal Vgn. The first Zener diode 112 has an anode coupled to the negative rail signal NRAIL and a cathode coupled to the nMOSFET gate signal Vgn. In an embodiment, a resistance value of the first resistor is one or more megaohms and a breakdown voltage of the first Zener diode 112 is equal to the breakdown voltage of the fourth Zener diode 118 (e.g., less than 6V).

When the input voltage VIN has a positive voltage value relative to the ground GND, the negative rail signal NRAIL has a value substantially equal to the ground GND. In this case, when the input voltage VIN has a magnitude relative to the ground GND that is less than the breakdown voltage of the first Zener diode 112, the first Zener diode 112 does not conduct current and the nMOSFET gate signal Vgn has a voltage value substantially equal to the voltage value of the input voltage VIN, which causes the first and second nMOSFETs 132 and 134 to be turned off. When the input voltage VIN has a magnitude relative to the ground GND that is greater than or equal to the breakdown voltage of the first Zener diode 112, the first Zener diode 112 conducts current and the nMOSFET gate signal Vgn has a positive voltage value having a magnitude according to the breakdown voltage of the first Zener diode 112, which causes the first and second nMOSFETs 132 and 134 to operate in a saturated mode.

When the input voltage VIN has a negative voltage value relative to the ground GND, the negative rail signal NRAIL has a value substantially equal to the input voltage VIN. In this case, the nMOSFET gate signal Vgn has a voltage value substantially equal to the input voltage VIN.

Accordingly, the nMOSFET gate signal Vgn operates to turn off the first and second nMOSFETs 132 and 134 when the input voltage VIN has a voltage value relative to the ground GND that is less than the breakdown voltage of the fourth Zener diode 118, including when the input voltage VIN has a voltage value that is negative relative to the ground GND. The nMOSFET gate signal Vgn operates to place the first and second nMOSFETs 132 and 134 in a saturation mode when the input voltage VIN has a positive voltage value relative to the ground GND that is greater than the breakdown voltage of the first Zener diode 112, causing the voltage value of the protected internal power voltage PWRP_INT to be clamped to a value corresponding the breakdown voltage of the first Zener diode 112 minus a threshold voltage $V_{TH}$ of the first and second nMOSFETs 132 and 134.

The first and second pMOSFETs 122 and 124 operate as a current mirror to generate the pMOSFET gate signal Vgp. Respective sources of the first and second pMOSFETs 122 and 124 are coupled to the positive rail signal PRAIL. Respective gates of the first and second pMOSFETs 122 and 124 are coupled to a drain of the first pMOSFET 122.

A drain of the second pMOSFET 124 is coupled to the pMOSFET gate signal Vgp and to a first terminal of the fourth resistor 110. A second terminal of the fourth resistor 110 is coupled to the ground GND.

The drain of the first pMOSFET 122 is coupled to a Zener voltage node Vz through the third resistor 108. The second resistor 106 is coupled between the positive rail signal PRAIL and the Zener voltage node Vz. The capacitor 138 is coupled between the Zener voltage node Vz and the ground GND, and operates to reduce noise and smooth changes of the Zener voltage node Vz.

The second Zener diode 114 has an anode coupled to the ground GND and a cathode couple to the Zener voltage node Vz. In an embodiment, a breakdown voltage of the second Zener diode 114 is equal to the breakdown voltage of the fourth Zener diode 118. In an embodiment, the breakdown voltage of the second Zener diode 114 is less than six (6) volts.

When the voltage value of the positive rail signal PRAIL is less than the breakdown voltage of the second Zener diode 114, no current flows through the first pMOSFET 122 because the second Zener diode 114 is operating in reverse bias at below its breakdown voltage. As a result, no current flows through the second pMOSFET 124 and a voltage value of the pMOSFET gate signal Vgp is equal to the voltage value of the ground GND.

When the voltage value of the positive rail signal PRAIL is greater than the breakdown voltage of the second Zener diode 114, current flows through the first pMOSFET 122 because the second Zener diode is operating at above its breakdown voltage. As a result, current flows through the second pMOSFET 124 and a voltage value of the pMOSFET gate signal Vgp is equal to a voltage value of the positive rail signal PRAIL.

Accordingly, when the input voltage VIN has a negative value with respect to the ground GND, the positive rail signal PRAIL has a voltage value equal to the voltage value of the ground GND, the pMOSFET gate signal Vgp has a voltage value equal to the value of the ground GND, and the third and fourth pMOSFETs 126 and 128 are turned off, and no current is supplied to the protected internal power voltage PWRP_INT. As a result, when the input voltage VIN has a negative value with respect to the ground GND, the protected internal power voltage PWRP_INT has a voltage value equal to the ground GND.

Furthermore, when the input voltage VIN has a positive voltage value with respect to the ground GND and the voltage value of the input voltage VIN is less than the breakdown voltage of the second Zener diode 114, the pMOSFET gate signal Vgp is pulled down to the ground GND, but because the input voltage VIN has the positive voltage value, the third and fourth pMOSFETs 126 and 128 are turned on and the protected internal power voltage PWRP_INT has a voltage value equal to the voltage value of the input voltage VIN with respect to the ground GND.

Finally, when the input voltage VIN has a positive voltage value with respect to the ground GND and the voltage value of the input voltage VIN is greater than or equal to the breakdown voltage of the second Zener diode 114, positive rail signal PRAIL has a voltage value equal to the voltage value of the input voltage VIN, the pMOSFET gate signal Vgp has a voltage value equal to the voltage value of positive rail signal PRAIL, and as a result the third and fourth pMOSFETs 126 and 128 are turned off, and no current flows to the protected internal power voltage PWRP_INT through the third and fourth pMOSFETs 126 and 128, so that the value of the protected internal power voltage PWRP_INT is controlled by the first and second nMOSFETs 132 and 134.

Figure 1B:
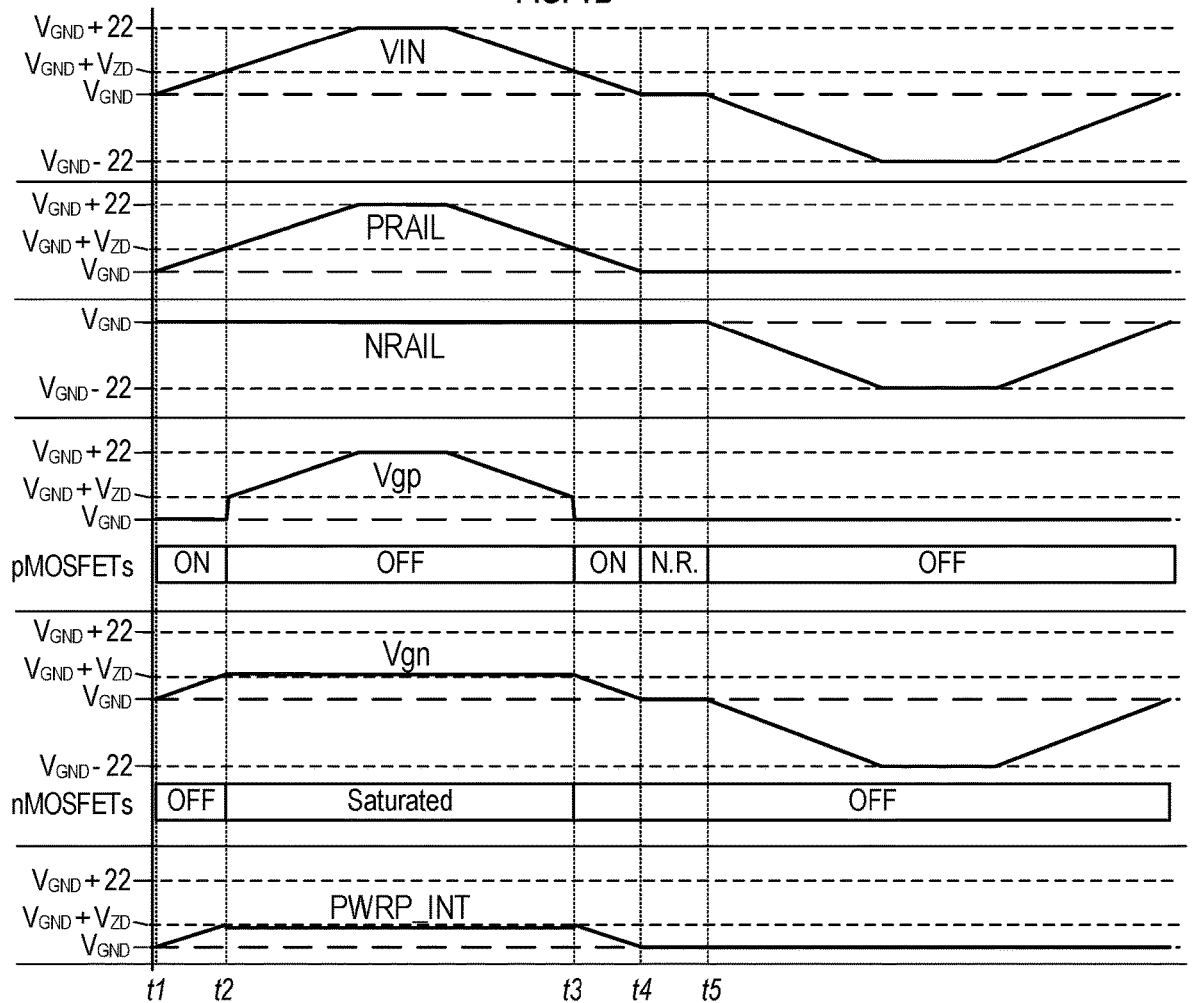
FIG. 1B is a diagram including voltage waveforms illustrating an operation of the protection circuit of FIG. 1A according to an embodiment.

FIG. 1B is a diagram including voltage waveforms illustrating an operation of the protection circuit 100 of FIG. 1A according to an embodiment. The voltages waveforms illustrated include the input voltage VIN, the positive rail signal PRAIL, the negative rail signal NRAIL, the pMOSFET gate signal Vgp, the nMOSFET gate signal Vgn, and the protected internal power voltage PWRP_INT. All voltages are indicated relative to the ground GND, which is considered to have a voltage value of 0V.

Also indicated in FIG. 1B is the state of the third and fourth pMOSFETs 126 and 128 (labeled as "pMOSFETs") and the state of the first and second nMOSFETs 132 and 134 (labeled as "nMOSFETs").

In the embodiment illustrated in FIG. 1B, the first to fourth Zener diodes 112 to 118 of FIG. 1 all have a same breakdown voltage $V_{ZD}$). In an embodiment, the breakdown voltage $V_{ZD}$ is less than 6V.

At a first time t1, the input voltage VIN has a value of 0V with respect to ground. As a result, all of the other signals have values of 0V.

In the interval between the first time t1 and a second time t2, the input voltage VIN has a value greater than 0V and less than the breakdown voltage $V_{ZD}$. The positive rail signal PRAIL and nMOSFET gate signal Vgn have respective values substantially equal to the input voltage VIN, and the negative rail signal NRAIL and the pMOSFET gate signal Vgp have respective values substantially equal to the ground GND.

As a result, third and fourth pMOSFETs 126 and 128 are turned completely on and current flows from the input voltage VIN through the third and fourth pMOSFETs 126 and 128 to the protected internal power voltage PWRP_INT, so that a value of the protected internal power voltage PWRP_INT is substantially equal to the input voltage VIN. Under these conditions, the first and second nMOSFETs 132 and 134 are turned off.

In the interval between the second time t2 and a third time t3, the input voltage VIN has a value greater than 0V and greater than the breakdown voltage $V_{ZD}$ plus a threshold voltage $V_{TH}$ of the first and second nMOSFETs 132 and 134. The positive rail signal PRAIL and pMOSFET gate signal Vgp have respective values substantially equal to the input voltage VIN, the negative rail signal NRAIL has a value substantially equal to the ground GND, and the nMOSFET gate signal Vgn has a voltage substantially equal to the breakdown voltage $V_{ZD}$ plus the threshold voltage $V_{TH}$.

As a result, third and fourth pMOSFETs 126 and 128 are turned completely off. The first and second nMOSFETs 132 and 134 operate in a saturated mode and current flows from the input voltage VIN through the first and second nMOSFETs 132 and 134 to the protected internal power voltage PWRP_INT, so that a value of the protected internal power voltage PWRP_INT is substantially equal to the breakdown voltage $V_{ZD}$ minus the threshold voltage $V_{TH}$ of the first and second nMOSFETs 132 and 124.

In the interval between the third time t3 and a fourth time t4, the input voltage VIN has a value greater than 0V and less than the breakdown voltage $V_{ZD}$. The positive rail signal PRAIL and nMOSFET gate signal Vgn have respective values substantially equal to the input voltage VIN, and the negative rail signal NRAIL and the pMOSFET gate signal Vgp have respective values substantially equal to the ground GND.

As a result, third and fourth pMOSFETs 126 and 128 are turned completely on and current flows from the input voltage VIN through the third and fourth pMOSFETs 126 and 128 to the protected internal power voltage PWRP_INT, so that a value of the protected internal power voltage PWRP_INT is substantially equal to the input voltage VIN. Also as a result of these conditions, the first and second nMOSFETs 132 and 134 are turned off.

In the interval between the fourth time t4 and a fifth time t5, when the input voltage VIN is equal to the ground GND, whether the third and fourth pMOSFETs 126 and 128 are turned on or off is Not Relevant, indicated by "N.R." in FIG. 1B.

In an interval after a fifth time t5, the input voltage VIN has a value less than 0V. The positive rail signal PRAIL and pMOSFET gate signal Vgp have respective values substantially equal to the ground GND, and the negative rail signal NRAIL and the nMOSFET gate signal Vgn have respective values substantially equal to the input voltage VIN.

As a result, the third and fourth pMOSFETs 126 and 128 and the first and second nMOSFETs 132 and 134 are turned off, and no current flows from the input voltage VIN to the protected internal power voltage PWRP_INT. The protected internal power voltage PWRP_INT therefore has a value substantially equal to the ground GND.

Figure 2:
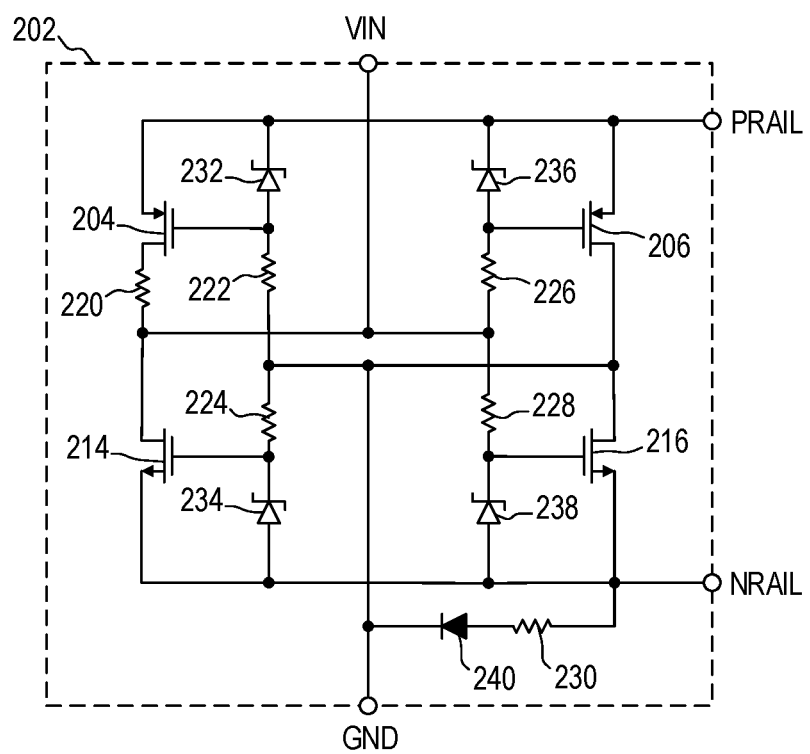
FIG. 2 illustrates a positive and negative rail generator circuit suitable for use in an embodiment.

FIG. 2 illustrates a positive and negative (PN) rail generator circuit 202 suitable for use in an embodiment of the protection circuit 100 of FIG. 1. The PN rail generator circuit 202 includes first and second pMOSFETs 204 and 206, first and second nMOSFETs 214 and 216, first, second, third, fourth, and fifth resistors 222, 224, 226, 228, and 230, first, second, third, and fourth Zener diodes 232, 234, 236, and 238, and first diode 240.

The PN rail generator circuit 202 receives an input voltage VIN and a ground GND. The PN rail generator circuit 202 generates a positive rail signal PRAIL and a negative rail signal NRAIL using the input voltage VIN and the ground GND. The positive rail signal PRAIL is generated having a voltage value corresponding to the most positive of the input voltage VIN and the ground GND. The negative rail signal NRAIL is generated having a voltage value corresponding to the most negative of the input voltage VIN and the ground GND.

When the input voltage VIN has a voltage value that is greater than that of the ground GND, the first pMOSFET 204 and the second nMOSFET 216 are turned on, and the second pMOSFET 206 and the first nMOSFET 214 are turned off. This couples the input voltage VIN to the positive rail signal PRAIL and couples the ground GND to the negative rail signal NRAIL.

When the input voltage VIN has a voltage value that is less than that of the ground GND, the second pMOSFET 206 and the first nMOSFET 214 are turned on, and the first pMOSFET 204 and the second nMOSFET 216 are turned off. This couples the input voltage VIN to the negative rail signal NRAIL and couples the ground GND to the positive rail signal PRAIL.

The first to fourth Zener diodes 232 to 238 and the first to fourth resistors 22 to 228 operate to limit the gate voltages of the first and second pMOSFETs 204 and 206 and the first and second nMOSFETs 214 and 216. The diode 240 and the fifth resistor 230 operate to assist the negative rail signal NRAIL in following the ground GND when the ground GND has a voltage value less than the input voltage VIN.

Embodiments provide protection against overly high or reversed-polarity input voltages to an electronic circuit. Embodiments provide a reduced voltage drop when the input voltage is greater than zero but less than a limit voltage of the output voltage of the embodiment, such as the breakdown voltage of a Zener diode employed to clamp the output voltage. Embodiments provide the output voltage clamped to the limit voltage when the input voltage is higher than the limit voltage. Embodiments offer decreased power dissipation compared to solutions previously known in the art.

Embodiments of the present disclosure include electronic devices configured to perform one or more of the operations described herein. However, embodiments are not limited thereto.

While illustrative embodiments have been disclosed to aid in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. A circuit comprising:
   a ground signal;
   a first n-channel Metal Oxide Semiconductor Field Effect Transistor (nMOSFET) having a drain terminal coupled to an input voltage;
   a second nMOSFET having a drain terminal coupled to an output voltage and a source coupled to a source of the first nMOSFET;
   a first p-channel Metal Oxide Semiconductor Field Effect Transistor (pMOSFET) having a drain terminal coupled to the input voltage;
   a second pMOSFET having a drain terminal coupled to the output voltage and a source coupled to a source of the first pMOSFET; and
   a control circuit coupled to respective gates of the first nMOSFET, the second nMOSFET, the first pMOSFET, and the second pMOSFET, the control circuit to operate the first nMOSFET, the second nMOSFET, the first pMOSFET, and the second pMOSFET based on the input voltage as measured relative to the ground signal.

2. The circuit of claim 1, wherein the control circuit operates to:
turn the first and second nMOSFETs off and turn the first and second pMOSFETs on in response to the input voltage being greater than zero and less than a predetermined positive limit voltage,
operate the first and second nMOSFETs in a saturation mode and turn the first and second pMOSFETs off in response to the input voltage being greater than the predetermined positive limit voltage, and
turn the first and second nMOSFETs off and turn the first and second pMOSFETs off in response to the input voltage being less than zero.

3. The circuit of claim 1, further comprising:
an nMOSFET control signal generated by the control circuit and coupled to a gate of the first nMOSFET and to a gate of the second nMOSFET; and
a pMOSFET control signal generated by the control circuit and coupled to a gate of the first pMOSFET and to a gate of the second pMOSFET.

4. The circuit of claim 3, wherein the control circuit is further to:
when the input voltage, measured relative to the ground signal, is greater than zero and less than the predetermined positive limit voltage, generate the pMOSFET control signal having a voltage value substantially equal to the ground signal;
when the input voltage has the voltage value, measured relative to the ground signal, is greater than a sum of the predetermined positive limit voltage and a threshold voltage of the pMOSFET, generate the pMOSFET control signal having a voltage value substantially similar to the input voltage; and
when the input voltage has the voltage value, measured relative to the ground signal, is less than zero, generate the pMOSFET control signal having a voltage value substantially similar to the ground signal.

5. The circuit of claim 3, wherein the control circuit is further to:
when the input voltage, measured relative to the ground signal, is greater than zero and less than the predetermined positive limit voltage, generate the nMOSFET control signal having a voltage value substantially similar to the input voltage;
when the input voltage, measured relative to the ground signal, is greater than the predetermined positive limit voltage, generate the nMOSFET control signal having a voltage value substantially similar to the predetermined positive voltage limit; and
when the input voltage, measured relative to the ground signal, is less than zero, generate the nMOSFET control signal having a voltage value substantially similar to the input voltage.

6. The circuit of claim 3, further comprising:
a positive and negative rail generator circuit to generate a positive rail signal and a negative rail signal, the positive and negative rail generator circuit to:
when the voltage value of input voltage is a positive voltage relative to the ground signal, generate the positive rail signal having a voltage value corresponding to the input voltage and generate the negative rail signal having a voltage value corresponding to the ground signal, and
when the voltage value of input voltage is a negative voltage relative to the ground signal, generate the positive rail signal having a voltage value corresponding to the ground signal and generate the negative rail signal having a voltage value corresponding to the input voltage,
wherein the control circuit is further to:
generate the nMOSFET control signal using the negative rail signal, and
generate the pMOSFET control signal using the positive rail signal.

7. The circuit of claim 6, further comprising:
a Zener diode having an anode connected to the negative rail signal and a cathode connected to the nMOSFET control signal, the Zener diode having a breakdown voltage substantially equal to the predetermined positive limit voltage; and
a resistor coupled between the input voltage and the nMOSFET control signal.

8. The circuit of claim 6, further comprising:
a first resistor coupled between the positive rail signal and a Zener voltage node;
a Zener diode having an anode coupled to the ground signal and a cathode coupled to the Zener voltage node, the Zener diode having a breakdown voltage substantially equal to the predetermined positive limit voltage;
a current mirror circuit having an input transistor coupled between the positive rail signal and the Zener voltage node and an output transistor coupled between the positive rail signal and the pMOSFET control signal; and
a second resistor coupled between the pMOSFET control signal and the ground signal,
wherein the control circuit is further to:
when substantially no current flows through the Zener diode, generate the pMOSFET control signal having a voltage value substantially equal to the voltage value of the ground signal, and
when a current flows through the Zener diode, generate the pMOSFET control signal having a voltage value substantially equal to the voltage value of the positive rail signal.

9. The circuit of claim 8, further comprising:
a third resistor coupled between the input transistor of the current mirror and the Zener voltage node; and
a capacitor coupled between the Zener voltage node and the ground signal.

10. A method of generating an output voltage from an input voltage, the method comprising:
in response to the input voltage having a voltage value, relative to a ground signal, that is between zero and a predetermined limit voltage, producing the output voltage by:
turning on a first circuit coupled between the input voltage and the output voltage, and
turning off a second circuit coupled between the input voltage and the output voltage;
in response to the input voltage having a voltage value, relative to the ground signal, that has a same polarity as the predetermined limit voltage and a greater magnitude than the predetermined limit voltage, producing the output voltage by:
turning off the first circuit, and
operating the second circuit in a saturation mode; and in response to the input voltage having a polarity, relative to the ground signal, opposite the polarity of the predetermined limit voltage, producing the output voltage substantially equal to the ground signal by:
turning off the first circuit, and
turning off the second circuit,
wherein the first circuit includes first and second transistors having a first channel doping type connected in series between the input voltage and the output voltage,
wherein the second circuit includes first and second transistors having a second channel doping type connected in series between the input voltage and the output voltage, and
wherein the first channel doping type and the second channel doping type are each one of a p-type or an n-type and the first channel doping type is different from the second channel doping type.

11. The method of claim 10,
wherein the limit voltage is a positive voltage,
wherein the first and second transistors having the first channel doping type are first and second p-channel Metal Oxide Semiconductor Field Effect Transistors (pMOSFETs), and a source of the first pMOSFET is coupled to a source of the second pMOSFET, and
wherein the first and second transistors having the second channel doping type are first and second n-channel Metal Oxide Semiconductor Field Effect Transistors (nMOSFETs), and a source of the first nMOSFET is coupled to a source of the second nMOSFET.

12. The method of claim 11, further comprising:
generating a positive rail signal corresponding to the one of the input voltage and the ground signal having the most positive voltage value;
generating a negative rail signal corresponding to the one of the input voltage and the ground signal having the most negative voltage value;
controlling the first circuit using one of the positive rail signal and the negative rail signal; and
controlling the second circuit using the other of the positive rail signal and the negative rail signal.

13. The method of claim 12, further comprising:
generating a control signal at a node, the node being coupled to the input voltage using a resistor and coupled to one of the positive rail signal and the negative rail signal using a Zener diode; and
controlling the second circuit according to the control signal.

14. The method of claim 10, further comprising controlling the first circuit according to a voltage across and a current through a Zener diode, including:
turning the first circuit on when the Zener diode is reverse biased and the current through the Zener diode is substantially zero;
turning the first circuit off when the Zener diode is reverse biased and a substantially non-zero current flows through the Zener diode.

15. The method of claim 14, further comprising controlling the first circuit by:
receiving, by a current mirror, the current through the Zener diode;
generating, by the current mirror, an output current according to the current through the Zener diode;
generating, using the output current, a control signal; and
controlling the first circuit according to a voltage value of the control signal.

16. The method of claim 15, further comprising:
receiving, by a current mirror, the current through the Zener diode through a low-pass filter circuit.

17. A circuit comprising:
a first circuit including a plurality of transistors of a first channel doping type;
a second circuit including a plurality of transistors of a second channel doping type, the second channel doping type being different from the first channel doping type; and
a control circuit, the control circuit to:
receive a first voltage at an input terminal,
turn the first circuit on in response to a first voltage having a polarity equal to a polarity of a predetermined limit voltage and a magnitude less than a magnitude of the predetermined limit voltage,
turn the second circuit off in response to the first voltage having the polarity equal to the polarity of the predetermined limit voltage and the magnitude less than the magnitude of the predetermined limit voltage,
turn the first circuit off in response to the first voltage having the polarity identical to the polarity of the predetermined limit voltage and the magnitude greater than the magnitude of the predetermined limit voltage,
operate the second circuit in a saturated mode in response to the first voltage having the polarity identical to the polarity of the predetermined limit voltage and the magnitude greater than the magnitude of the predetermined limit voltage,
turn the first circuit off in response to the first voltage having the polarity not equal to the polarity of the predetermined limit voltage, and
turn the second circuit off in response to the first voltage having the polarity not equal to the polarity of the predetermined limit voltage.

18. The circuit of claim 17, further comprising:
the first circuit comprising a first Metal Oxide Semiconductor Transistor (MOSFET) and a fourth MOSFET, wherein the first and second MOSFETs are of the first channel doping type, a drain terminal of the first MOSFET is coupled to the input terminal, and a source terminal of the first MOSFET is coupled to a source terminal of the second MOSFET; and
the second circuit comprising a third MOSFET and a second MOSFET, wherein the third and fourth MOSFETs are of the second channel doping type, a drain terminal of the third MOSFET is coupled to the input terminal, and a source terminal of the third MOSFET is coupled to a source terminal of the fourth MOSFET.

19. The circuit of claim 17, wherein the control circuit comprises:
a rail generator circuit, the rail generator circuit to generate:
a positive rail signal having a voltage corresponding to the greater of the first voltage and a ground voltage, and
a negative rail signal having a voltage corresponding to the lesser of the first voltage and the ground voltage.

20. The circuit of claim 17, wherein the control circuit controls the first circuit using a first signal and controls the second circuit using a second signal different from the first signal.

* * * * *